United States Patent
Sardou

(10) Patent No.: US 7,311,124 B2
(45) Date of Patent: Dec. 25, 2007

(54) METHOD OF PRODUCING A SPRING WIRE AND WIRE THUS PRODUCED

(76) Inventor: Max Sardou, 18, Rue du Sauvoy, Saint-Soupplets (FR) F-77165

( * ) Notice: Subject to any disclaimer, the term of this patent is extended or adjusted under 35 U.S.C. 154(b) by 34 days.

(21) Appl. No.: 10/571,264

(22) PCT Filed: Sep. 8, 2004

(86) PCT No.: PCT/FR2004/002273

§ 371 (c)(1),
(2), (4) Date: Mar. 9, 2006

(87) PCT Pub. No.: WO2005/028189

PCT Pub. Date: Mar. 31, 2005

(65) Prior Publication Data

US 2007/0084181 A1    Apr. 19, 2007

(30) Foreign Application Priority Data

Sep. 16, 2003  (FR) .................................. 03 10823

(51) Int. Cl.
*B21F 45/00* (2006.01)

(52) U.S. Cl. ..................... 140/71 C; 140/103; 140/124; 267/166; 264/281

(58) Field of Classification Search .............. 140/71 C, 140/102, 103, 124; 72/135, 138, 140; 267/148, 267/166, 155, 157; 264/281; 156/169, 175; 29/896.9, 896.91
See application file for complete search history.

(56) References Cited

U.S. PATENT DOCUMENTS

| 2,887,721 | A | * | 5/1959 | Blanchi et al. ............. 156/180 |
| 4,434,121 | A | * | 2/1984 | Schaper ..................... 264/136 |
| 4,481,056 | A | | 11/1984 | Kuhl et al. |
| 4,889,327 | A | * | 12/1989 | Seyler ........................ 267/168 |
| 5,603,490 | A | * | 2/1997 | Folsom ....................... 267/149 |
| 5,988,612 | A | * | 11/1999 | Bertelson ................... 267/148 |
| 6,612,556 | B2 | * | 9/2003 | Petrina ....................... 267/168 |

FOREIGN PATENT DOCUMENTS

| DE | 30 31 582 | 3/1982 |
| DE | 30 37 616 | 5/1982 |
| DE | 33 20 605 | 12/1984 |
| FR | 1 069 192 | 7/1954 |
| FR | 1 200 649 | 12/1959 |

* cited by examiner

*Primary Examiner*—Ed Tolan
(74) *Attorney, Agent, or Firm*—Young & Thompson

(57) ABSTRACT

Method of producing spring wires shaped as a cylinder. The wire includes at least one first plurality of layers of wound fibres, the layers being disposed on top of one another and impregnated with a matrix. The first plurality of layers includes at least two stacked layers of fibres which are wound in opposing directions along two coaxial helices around the same axis to the left and right thereof respectively. The tangents to the two helices together with the axis (10) form respectively two angles having values $\beta_{x-1}$ and $\beta_x$ which are respectively equal to $\Delta+k\gamma$ and $-\Delta-k\gamma$, $\gamma$ being a function of the value of the modulus of elasticity for the spring to be produced and k being a factor of between 0 and 1. The method is suitable for the production of helical cylindrical-type spring wires for the suspension systems of motor vehicles.

22 Claims, 2 Drawing Sheets

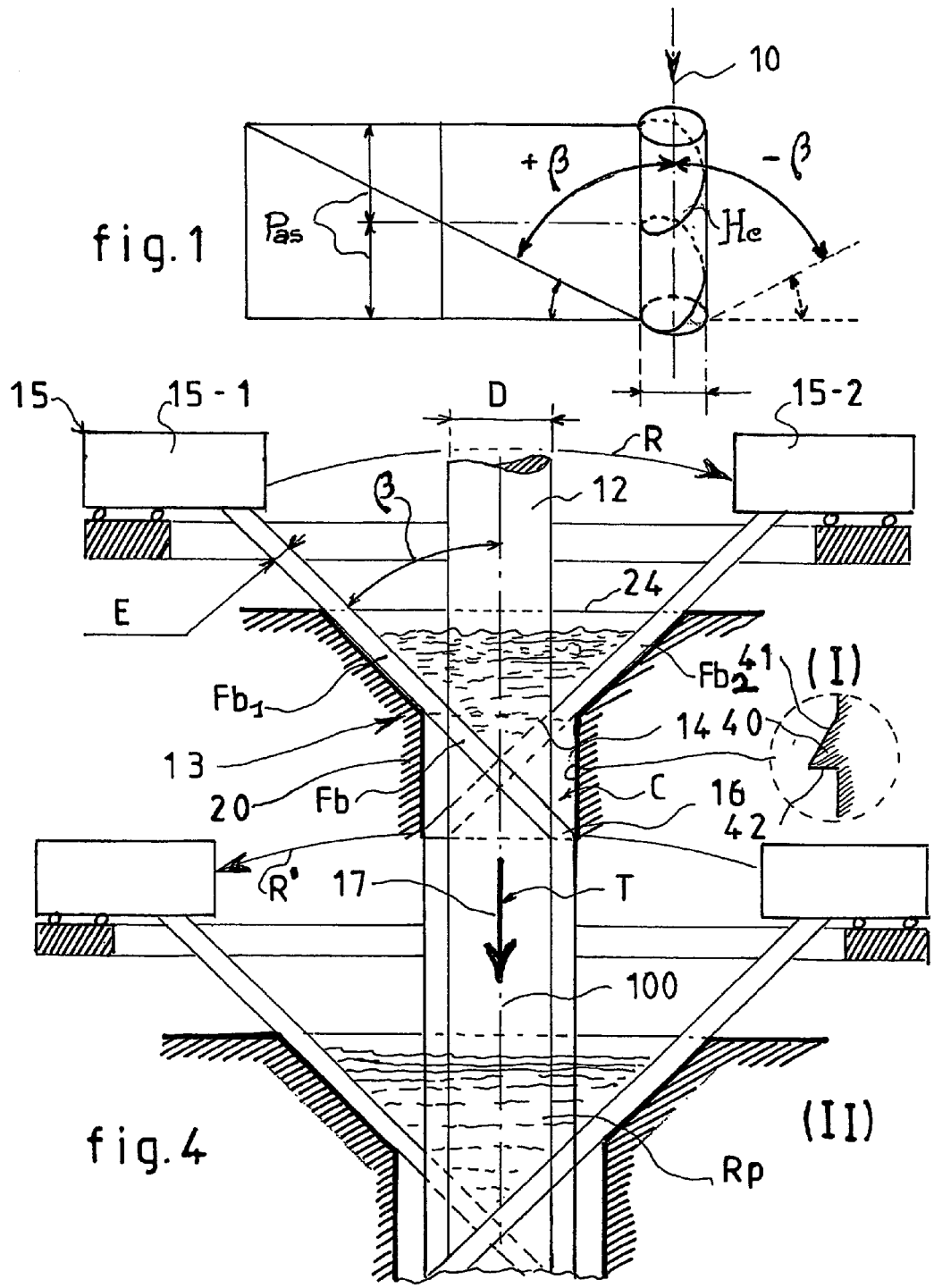

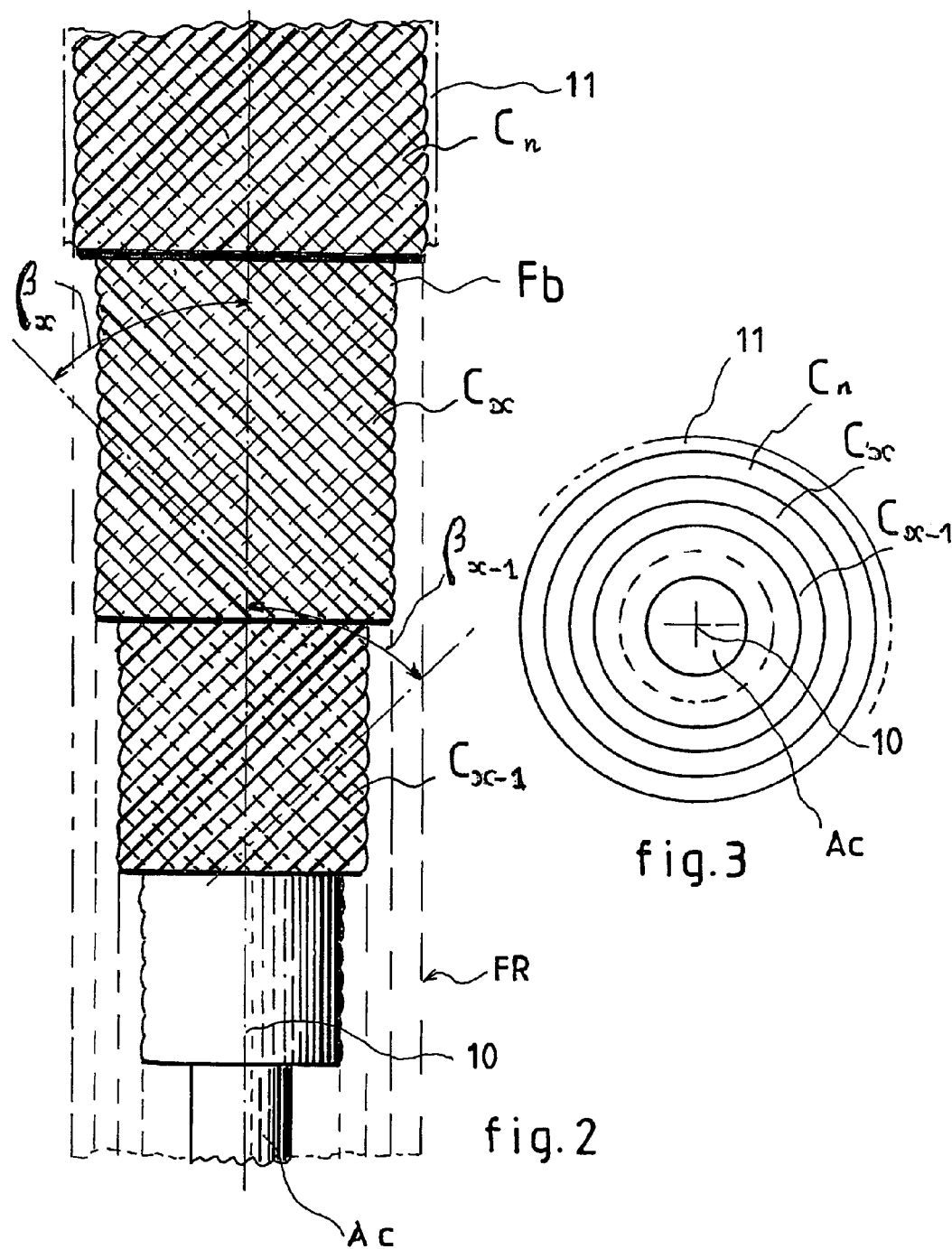

METHOD OF PRODUCING A SPRING WIRE AND WIRE THUS PRODUCED

This application is a 35 U.S.C 371 of PCT/FR04/02273, filed Aug. 8, 2004.

The present invention relates to wire substantially in the form of a cylinder for making springs, advantageously of the helically-wound cylindrical type, or the like, and also torsion bars or the like that find applications in numerous industrial fields, and are particularly advantageous for making suspensions for motor vehicles, trucks, rail vehicles, or the like.

There exist substantially cylindrically-shaped wires for making springs, the wires including at least a first plurality of helically-wound fiber layers, said layers being situated on one another and impregnated by a matrix, the fibers generally being glass fibers, and the matrix generally being a polymerizable resin of the epoxy, vinylester, or polyester type.

These spring wires are very advantageous since they present the advantage of a much smaller ratio of weight over volume occupied than applies to metal wires used for making springs enabling identical resilient forces to be delivered.

An object of the present invention is to provide an industrial and particularly inexpensive method of providing an improvement to wires of the above-defined type as are known in the prior art, to give them a modulus of elasticity of much greater value, and to do so for wires of the same section.

The present invention also provides a spring wire obtained by implementing the method of the invention.

More precisely, the present invention provides a method of making a spring wire comprising at least one layer of a fiber wound helically on a cylindrical "primary" portion of diameter equal to D, the tangent to said helix making an angle relative to the axis of the primary portion having a value β, said layer also being suitable for being bonded to the primary portion by a matrix, the fiber, once wound around the primary portion, presenting a cross-section that is substantially rectangular, of thickness E in the radial direction of the primary portion and of width E' in the direction perpendicular to the tangent to the helix, the method consisting in preparing a funnel of frustoconical shape, said funnel having a small opening corresponding to the small base of the frustoconical shape, in preparing a supply to deliver the fiber, in connecting one of the ends of said fiber to the primary portion, and in imparting rotary movement to said supply at a speed ω about the axis of said primary portion, said primary portion being moved in translation at a speed T through the funnel along its axis going from its large opening towards its small opening, the method being characterized by the fact that it further consists in causing said fiber to penetrate into the funnel via its large opening corresponding to the large base of the frustoconical shape, the angle at the apex of said funnel having a value that is substantially equal to 2β, the small base of the frustoconical shape of said funnel having a diameter equal to D+2E, the value ω of the speed in rotation of the supply expressed in revolutions per second, and the value T of the speed in translation of the primary portion expressed in meters per second being associated by the following relationship:

$$\omega = \frac{T}{D\pi[\tan(\frac{\pi}{2} - \beta)]}$$

The present invention also provides a wire for making a spring, the wire being obtained by the above-defined method, said wire being substantially cylindrical in shape and including at least a first plurality of layers of wound fibers, said layers being situated on one another and being impregnated with a matrix, the wire being characterized by the fact that said first plurality of layers comprises at least two layers of fibers situated on each other, the fibers of these two layers being wound in opposite directions relative to each other in two helical pitches about a common axis, respectively left-handedly and right-handedly, the tangents to these two helices forming angles relative to said axis with respective values $\beta_{x-1}$ and $\beta_x$ that are substantially equal respectively to $\Delta+k\gamma$ and $-\Delta-k\gamma$, where $\gamma$ is a function of the value of the modulus of elasticity for the spring to be obtained and "k" is a factor of having a value lying in the range zero to one, the value $\Delta$ being no greater than substantially 44.6°.

Other characteristics and advantages of the invention appear from the following description given with reference to the accompanying drawings by way of non-limiting illustration, in which:

FIG. 1 is a diagram showing the principle of a helical curve and the main parameters for defining it in application of mathematical relationships;

FIGS. 2 and 3 are two views of an embodiment of a wire of the invention, FIG. 2 being a cutaway side view and FIG. 3 being a diagrammatic cross-section view; and FIG. 4 shows an embodiment of means enabling the method of the invention to be implemented for making the wire of the invention.

It is specified that in the figures the same references are used to designate elements that are the same, regardless of the figure in which they appear and regardless of the way in which the elements are shown. Similarly, if elements are not specifically referenced in any one of the figures, their references can easily be found by referring to another figure.

FIG. 1 is a diagram showing the main parameters for defining a helical curve in application of mathematical relationships. This curve is referenced He in the figure and its defining parameters, e.g. the helical pitch Pas are known. They are described in particular on page 272 of the book entitled "Guide du dessinateur industriel" [Industrial drawing guide] by A. Chevalier, 1984-1985 edition, published by Hachette Technique.

That said, FIGS. 2 and 3 show an embodiment of a wire suitable for use in making a spring and having substantially the shape of a cylinder FR that is advantageously a circular cylinder, By way of example, the spring may be of the type mentioned in the introduction. The wire includes at least a first plurality of layers $C_{x-1}$, $C_x$, ..., $C_n$ of wound fibers Fb, the layers being situated on one another and impregnated in a matrix Rp.

According to an important characteristic of the invention, the first plurality of layers comprises at least two layers $C_{x-1}$, $C_x$ of fibers wound in opposite directions to each other following two coaxial helices about a common axis 10, respectively left-handedly and right-handedly (in other words: the algebraic sign of the helix angle $\beta_x$ is positive for one of them and negative for the other).

The tangents to these two helices form two angles relative to the axis 10 of values $\beta_{x-1}$ and $\beta_x$ that are substantially equal respectively to $-(\Delta+k\gamma)$ and $\Delta+k\gamma$, where $\gamma$ is a function of the modulus of elasticity for the spring that is to be made and "k" is a factor having a value lying in the range zero to one. As a result, the tangents to the helices of two consecutive layers may form angles relative to the axis 10 having values lying in the range $\Delta$ and respectively $-(\Delta+\gamma)$ and $+(\Delta+\gamma)$, and any intermediate value.

The fibers Fb may be of different kinds, for example fibers of carbon, of Kevlar (registered trademark), of Deenema (registered trademark), of boron, etc. However they are advantageously glass fibers. The matrix may also be of various kinds, for example of light alloy or metal based on aluminum, magnesium, etc., or of a polymer material that is thermoplastic, thermosetting, etc. Nevertheless, when the fibers Fb are glass fibers, the matrix is advantageously a thermosetting polymerizable resin of the epoxy, polyester, vinylester, etc. type, such as the resin known in the trade under the reference Araldite (registered trademark).

The essential characteristics of the invention described above enable the above-defined objects of the invention to be achieved.

In an advantageous industrial application, in order to make a spring wire suitable for working in compression, the first plurality of layers comprises an even number "n" (n>2) of layers $C_1, \ldots, C_{x-1}, C_x, \ldots, C_n$ of fibers Fb situated on one another, the layer $C_1$ being the closest to the axis 10. These fibers are wound in helices that are all coaxial about the axis 10, and the helices of two consecutive layers $C_1, C_2; \ldots; C_{x-1}, C_x; \ldots; C_{n-1}, C_n$, are respectively left-handed and right-handed (winding angles of positive and negative signs), the tangents to these helices advantageously forming angles relative to the axis 10 having values respectively equal to $-\Delta$ and $\Delta$ for the first pair of layers $C_1, C_2$; to $-(\Delta+2\alpha)$ and $\Delta+2\alpha$ for the second pair of layers $C_3, C_4$; to $-(\Delta+4\alpha)$ and $\Delta+4\alpha$ for the third pair of layers $C_5, C_6$; and so on up to values of $(-\Delta+(n-2)\alpha)$ and $\Delta+(n-2)\alpha$ for the n/2 pair of layers $C_{n-1}, C_n$; where $\Delta$ is no greater than substantially 44.6°, and $-\alpha$ is substantially equal to $$\frac{\gamma}{n-2}.$$

However, and preferably, still for a wire for making a spring for working in compression, this first plurality of layers comprises "n" (n≧2) layers $C_1, \ldots, C_n$ of fibers Fb situated on one another, with the layer $C_1$ being the closest to the axis 10. The fibers are wound in helices that are all coaxial about the axis, with the helices of any two consecutive layers being respectively left-handed and right-handed (winding angles of positive and negative signs) and the tangents to these helices forming relative to the axis angles having values that are respectively equal to:

$-\Delta, +\Delta+\alpha, -(\Delta+2\alpha), \Delta+3\alpha, -(\Delta+4\alpha), \Delta+5\alpha, \ldots,$
$-(\Delta+(n-2)\alpha), \Delta+(n-1)\alpha;$ where $\Delta$ is no greater than substantially 44.6°, and $-\alpha$ is substantially equal to $$\frac{\gamma}{n-1}.$$

With a wire for making a spring suitable for working in traction, the first plurality of layers comprises a number "n" (n>2) of layers $C_1, \ldots, C_n$ of fibers Fb situated on one another, the layer $C_1$ being the closest to the axis 10, and the fibers being wound in helices that are all coaxial about the axis 10. The helices of two consecutive layers $C_1, C_2, \ldots; C_{n-1} C_n$ are respectively left-handed and right-handed (winding angles of positive and negative signs), and the tangents to these helices form angles relative to the axis 10 having values that are advantageously respectively equal to $\Delta$ and $-\Delta$ for the first pair of layers $C_1, C_2$; to $\Delta+2\alpha$ and $-(\Delta+2\alpha)$ for the second pair of layers $C_3, C_4$; to $\Delta+4\alpha$ and $-(\Delta+4\alpha)$ for the third pair of layers $C_5, C_6$; and so on up to $\Delta+(n-2)\alpha$ and $-(\Delta+(n-2)\alpha)$ for the $(n/2)^{th}$ pair of layers $C_{n-1}, C_n$; where $\Delta$ is no greater than substantially 44.6°, and $-\alpha$ is substantially equal to $$\frac{\gamma}{n-2}.$$

However, preferably, still for a wire for making a spring suitable for working in traction, the first plurality of layers comprises "n" (n≧2) layers $C_1, \ldots, C_n$ of fibers Fb situated on one another with the layer $C_1$ closest to the axis 10. The fibers are wound in helices that are all coaxial about the axis 10, with the helices of two consecutive layers being respectively left-handed and right-handed (winding angles of positive and negative signs), and the tangents to these helices form angles relative to said axis having values that are respectively equal to:

$\Delta, -(\Delta+1\alpha), \Delta+2\alpha, -(\Delta+3\alpha), \Delta+4\alpha, -(\Delta+5\alpha), \ldots,$
$\Delta+(n-2)\alpha), -(\Delta+(n-1)\alpha);$ where $\Delta$ is no greater than substantially 44.6°, and $-\alpha$ is substantially equal to $$\frac{\gamma}{n-1}.$$

Wires having a first plurality of layers of fibers in accordance with the above-defined characteristics give the best looked-for results when the first plurality of layers is situated at the periphery of the cylinder FR, i.e. when the layer of rank "n" is the closest to the side wall of the wire and when the layer of rank "1" is the closest to the axis 10.

As a result, it can be seen that the structure of the central portion of the wire is not of the greatest importance in obtaining a spring wire having a very good modulus of elasticity relative to its section. Thus, for reasons of economy, and as shown in FIGS. 2 and 3, the wire may have a central core Ac. In one possible embodiment, the central core Ac is made of a material having a low modulus of elasticity in twisting, e.g. an extruded tube or rod of a material that is metallic, thermoplastic, or thermosetting, or preferably of a material that is viscoelastic serving to confer vibration-damping properties on the spring, or indeed materials that are piezoelectric, or even a tube or rod comprising a matrix and reinforcing fibers forming an angle relative to the axis 10 with a value of less than 44.6°. Preferably, the value of this angle is equal to zero degrees, with the fibers then being substantially parallel to one another and to the axis 10.

However, it is also possible for the central core Ac to be made out of a material having a low modulus of elasticity in twisting, as mentioned above, together with a plurality of fiber layers situated concentrically on one another at the periphery of the central core, the fibers being preferably wound in coaxial helices with the tangents to these helices forming angles relative to the axis of the helices with a value that is advantageously equal to or no greater than substantially 44.6°, these fibers advantageously being of the same kind as that mentioned above.

Without this being absolutely necessary, it is also preferable in said plurality of fiber layers Fb, for the number of left-handed helices to be substantially equal to the number of right-handed helices, without it being essential for them to alternate between left-handed and right-handed.

It is also advantageous for the layers situated at the periphery of the cylinder FR, i.e. the layer of rank "n", and the layers immediately preceding it, to be thicker than the other layers situated further in, so as to give the outer layers greater resistance to twisting deformation and, for example, so as to avoid an effect of the wire swelling when subjected to loading once it constitutes a spring, it being specified that the layer of rank "n" may be a superposition of a plurality of layers having the same thickness but all wound in the same direction and with the same angle $\Delta$ as defined above.

Given that the wire is for making springs as mentioned in the introduction to the present description, e.g. in order to make motor vehicle suspensions or the like, it is also preferable for the wire further to include a protective sheath 11 surrounding the outside of the wire, in contact with the last layer $C_n$ of the first plurality of layers of fibers Fb.

This sheath may be constituted by a layer of elastic material, e.g. of silicone, rubber, polyurethane, or more generically of any thermosettable, thermoplastic, or vulcanizable material. It may also be a composite material based on fibers of Kevlar, Deenema, carbon, glass, Teflon (registered trademark), etc., placed in helices at an angle having a value greater than 44.6°, and preferably close to 90°, it being specified that the term "composite material" is used to mean an intimate assembly of fibers and a matrix.

It is specified that these wires for springs are advantageously made from layers of glass fibers bonded together by means of a polymerizable resin having the advantage of polymerizing slowly and at low temperature. As a result, it is possible, for example, to make a spring of the helically-wound cylindrical type, by winding the wire while the resin is not yet polymerized, the wire being wound on a mold or the like having the shape of the spring that is to be made. This technique is itself known and is not described in greater detail herein, merely to avoid making the present description too complicated.

However, in a preferred embodiment, particularly with certain materials constituting the fibers Fb, since the value $\Delta$ must be equal to or must tend to be equal to 44.6° after the spring wire has deformed, e.g. under twisting, in order to achieve this result more reliably, it is desirable to wind the fibers with a "laying" angle having a value that is less than 44.6°.

Given that an effect of twisting the wire can add up to 2° to the laying angle of the fibers situated at the periphery of the wire, but only 0.5° for the fibers situated close to the axis 10, e.g. when there are about ten layers, it is advantageous to ensure that the fibers situated at the surface of the wire have a laying angle equal to 44.6°-2°, while the fibers situated close to the central core or the axis 10 have a laying angle equal to 44.6°-0.5°.

The Applicant has made such a spring wire with the materials defined below in which the value of this laying angle was decreased substantially continuously from the inner first layer of rank "1" to the outer layer of rank "n" over the range 44.5° to 42.1°, where "n" was substantially equal to ten.

When the wire has a plurality of layers, as is the case in practice when making springs industrially, the value $\Delta$ is greater for the first layer situated towards the center of the wire, i.e. the layer of rank "1" which is the closest to the axis 10, and also for the following internal first layers, than for the layers situated at the surface of the wire, and it decreases down to a limit value for the layer of rank "n" that is closest to the side wall of the wire or to the periphery of the above-defined cylinder FR. When the number "n" of layers is about ten, the value $\Delta$ decreases substantially continuously from about 44.6° to about 42° on going from the first layer ($C_1$) near the central core to the last layer ($C_n$) at the periphery.

The present invention also provides a method of making a wire such as those described above. One possible implementation of the method is shown in FIG. 4.

An implementation of the method of the invention is described below when the wire is to have at least one layer C of fiber helically wound on a cylindrical "primary" portion 12 of diameter equal to D, the tangent to the helix making an angle relative to the axis 100 of said primary portion 12 having a value $\beta$, the layer C also being suitable for being bonded to the primary portion 12 by a matrix Rp, the fiber, once wound around the primary portion, presenting a cross-section that is substantially rectangular, having a thickness E in the radial direction of the primary portion 12 and a width E' in the direction perpendicular to the tangent to the helix.

It should be understood that the primary portion can be of any type, e.g. the above-described central core Ac.

With reference to FIG. 4, the method consists in preparing a funnel 13 of substantially frustoconical shape, advantageously of circular section, having an angle at the apex substantially equal to $2\beta$, the funnel having a small opening 14, corresponding to the small base of the frustoconical shape, of diameter equal to D+2E, this small opening advantageously being surrounded by a sleeve 20 having an inlet orifice substantially of the same diameter as the opening 14 (or possibly a value that is very slightly greater).

It is also advantageous for the outlet orifice of the sleeve 20 to be of a shape other than circular, for example to be elliptical or the like when it is necessary to obtain a wire of the invention that presents a section that is elliptical. Naturally, other shapes are possible, depending on the shape desired for the section of the wire.

The method also consists in preparing a supply 15 for delivering the fiber Fb1, e.g. a reel of glass fiber in the above-mentioned advantageous option.

One of the ends 16 of the fiber is connected to the primary portion 12, said fiber Fb1 penetrating into the funnel 13 through its large opening 24 corresponding to the large base of the frustoconical shape, prior to being wound around the primary portion 12 so as to lie flush with the frustoconical inside wall of the funnel, as shown in FIG. 4.

The method then consists in causing the supply 15 to rotate R at a speed of rotation $\omega$ about the axis 100 of the primary portion 12, this primary portion simultaneously being moved in translation 17 through the funnel 13 along its axis going from its large opening 24 towards its small opening 14.

In addition, the speed of rotation $\omega$ of the supply 14 is a function of the speed in translation T of the primary portion 12.

In one possible implementation that gives advantageous results, the value of $\omega$ expressed in revolution per second and the value of T expressed in meters per second are associated by the following relationship:

$$\omega = \frac{T}{D\pi[\tan(\frac{\pi}{2} - \beta)]}$$

The above-described implementation of the method is limited to making a layer C comprising only one helix. However, in order to obtain wires that are strong with a modulus of elasticity that makes them suitable for use in making springs, as mentioned above, it is clear that the layer C should have a finite number of helices situated in contact with one another and wound on the same primary portion 12 in order to obtain a layer C that is as solid as possible, as for making the spring wire shown in FIG. 2.

Under such circumstances, the method consists: in preparing X supplies 15-1, 15-2, ..., each of one or more fibers, one end of each fiber being connected to the primary portion 12, the X fibers penetrating into the funnel 13 through its large opening 24; and in causing the supplies to rotate R at the same speed of rotation ω about the axis 100 of the primary portion, while simultaneously causing the primary portion 12 to move in translation at the speed T towards the small opening of the funnel, with the number X of these supplies being equal to:

$$X = \pi \frac{D}{E} \sin(\frac{\pi}{2} - \beta)$$

As mentioned above, while the fiber is being wound helically around the primary portion 12, the primary portion carrying the wound fiber is moved in translation at the speed T.

This movement in translation can be selected to implement one of the following two techniques: continuous translation; stepwise translation.

Continuous translation can be envisaged, but it is clear that it can be obtained only by exerting continuous traction on the emerging end of the primary portion together with the wound fiber. This technique can present two drawbacks that can be troublesome in some circumstances, namely the primary portion together with the wound fiber can become stretched involuntarily, and during this stretching, even if the stretching is eliminated when the traction ceases to be applied, the primary portion with the wound fiber is subjected to a wringing effect, that runs the risk of changing the value of the fiber laying angle, of losing polymerizable resin, and thus of impeding proper manufacture of the wire.

Thus, under certain circumstances, it is advantageous to impart translation movement stepwise to the primary portion together with the wound fiber.

By way of example, such stepwise movement in translation can be obtained by applying oscillating motion to the funnel 13 along its axis, the small opening 14 presenting a kind of sleeve 20 that is substantially cylindrical with biting teeth on the surface of its inside wall, preferably microteeth.

By way of example, these biting teeth may be constituted by one or more rows of teeth 40 of sawtooth shape, each sawtooth (shown magnified in FIG. 4) having a flank 41 of small slope on its upstream side and an opposite flank 42 on its downstream side that is preferably perpendicular to the axis of the funnel 13, these sawteeth also being distributed continuously or discontinuously on the inside wall of the sleeve 20, either being disposed parallel to one another or in one or more helices having the same pitch as the helices formed by the fibers Fb.

These microteeth may be continuous or discrete, and they may be made from etching or striping in the material lining the bore of the sleeve 20. They may also be constituted by bristles or scales sloping towards the axial outlet, parallel to the axis of the sleeve 20 or preferably perpendicular to the helices formed by the fibers Fb, or the microrelief in the last surface layer of the wire. The teeth are preferably on the same scale as the microrelief on the surface formed by the fibers Fb or the microrelief of the last layer at the surface of the wire.

With teeth made in this way, and by imparting micro-oscillations to the funnel along its axis, the primary portion 12 together with the fiber Fb thereon is caused to move stepwise in translation. The oscillations "skip" from one microtooth to the immediately following microtooth along the bore of the sleeve 20. If the amplitude of the oscillations is small, typically the pitch size of the microrelief, the movement in translation can be considered as being continuous translation of average speed T, in which case it is possible to drive the supply(ies) 15 in rotation R at a speed of continuous value ω as defined above.

The description above relates to an implementation of the method of the invention for making one layer C on a primary portion 12, the layer comprising one or more helically-wound fibers, all of these fibers being wound in the same direction.

However, as mentioned above, a spring wire of the invention advantageously has a plurality of fiber layers wound helically in opposite directions in alternation from one layer to the next.

Portion I of FIG. 4 shows how a first layer of helically-wound fibers is made on the primary portion 12 with the fibers being wound in the direction given by arrow R. Portion II in the same figure shows a second layer of fibers being wound helically on the first layer and in the opposite direction as indicated by arrow R'. When making the second layer, the primary portion is constituted by the primary portion 12 for making the first layer plus said first layer.

Overall, FIG. 4 shows how two layers of fibers can be wound in opposite-direction helices, thus requiring two different funnels.

In another implementation of the method, it is possible to wind at least two layers of fibers helically in opposite directions one on the other, while using only one funnel.

Thus, for a wire that is to have "n" layers C of fibers Fb, each having a thickness E and being wound as "n" helices one on another in coaxial manner, respectively left-handedly and right-handedly on a cylindrical "primary" portion 12 of diameter equal to D, the tangents to the "n" helices being at angles relative to the axis 100 of the primary portion having respective values $\beta_1, \beta_2, \ldots, \beta_n$ progressing between $-\Delta-\gamma$ and $\Delta+\gamma$, the "n" layers C also being suitable for being bonded to one another and to the primary portion 12 by a matrix Rp, the method of the invention consists: in preparing a frustoconical funnel 13 having an angle at the apex equal to 2($\Delta+\gamma$), said funnel having a small opening 14 corresponding to the small base of its frustoconical shape of diameter equal to D+2nE; in preparing "n" supplies 15 of fibers; in connecting one of the ends 16 of the "n" fibers to the primary portion 12, the "n" fibers penetrating into the funnel 13 via its large opening 24 corresponding to the large base of its frustoconical shape; and in imparting rotary movement to the "n" supplies 15 in directions that are opposite from one to another and at respective speeds of rotation $\omega_1, \omega_2, \ldots, \omega_n$ about the axis 100 of the primary portion 12, the primary portion being moved in translation 17 through the funnel 13 along its axis going from the large opening 24 towards its small opening 14, the values $\omega_1, \omega_2, \ldots, \omega_n$ of the respective speeds of rotation of the "n" supplies 15 being functions of the speed in translation T of the primary portion and of the corresponding local laying angle $\beta$.

As mentioned above, the fibers could be bonded to the primary portion 12 and to one another by means of a liquid matrix such as the polymerizable resin if the fibers are glass fibers. It is therefore desirable to wet the primary portion 12 and the fibers themselves with the matrix prior to winding the helices. Each fiber can be impregnated by any method known to the person skilled in the art, in particular at a point upstream from the convergence in the funnel(s).

The method preferably further consists in filling the funnel 13 with a liquid matrix Rp prior to setting at least one supply 15 in rotation and moving the primary portion 12 in translation.

It is advantageous to position the funnels 13 in such a manner that their axes are vertical and coincide. Under such circumstances, the matrix remains fully contained in the funnel since the small opening 14 is of section equal to the total section of the primary portion covered in the layers of fibers. Consequently, the matrix does not run out through the opening 14, even in the event of production stopping, but is entrained only by the movements of the primary portion 12 and of the fibers being wound thereon, while impregnating them thoroughly so as to ensure they are properly bonded together. By running flush over the inside wall of the funnel as mentioned above, the fibers keep the funnel clean and prevent a layer of "dead" resin forming thereon which run the risk of polymerizing and thus of clogging the wall of the funnel.

It is advantageous to operate at a relatively low temperature, typically about 10° C., in order to benefit from the best working conditions for making the matrix.

Finally, it should be observed that when the drive is applied finally to the protective sheath 11 when that is constituted by fibers and a matrix as mentioned above, the bore of the sleeve 20 may present a surface similar to the fastener known under the trademark "Velcro" or the like.

The invention claimed is:

1. A method of making a spring wire comprising at least one layer (C) of a fiber wound helically on a cylindrical "primary" portion (12) of diameter equal to D, the tangent to said helix making an angle relative to the axis (100) of the primary portion (12) having a value $\beta$, said layer (C) also being suitable for being bonded to the primary portion (12) by a matrix (Rp), the fiber, once wound around the primary portion, presenting a cross-section that is substantially rectangular, of thickness E in the radial direction of the primary portion (12) and of width E' in the direction perpendicular to the tangent to the helix, the method consisting in preparing a funnel (13) of frustoconical shape, said funnel having a small opening (14) corresponding to the small base of the frustoconical shape, in preparing a supply (15) to deliver the fiber (Fb1), in connecting one of the ends (16) of said fiber to the primary portion (12), and in imparting rotary movement (R) to said supply (15) at a speed $\omega$ about the axis (100) of said primary portion (12), said primary portion being moved in translation (17) at a speed T through the funnel (13) along its axis going from its large opening (24) towards its small opening (14), the method being characterized by the fact that it further consists in causing said fiber (Fb1) to penetrate into the funnel (13) via its large opening corresponding to the large base of the frustoconical shape before being rolled up around the primary portion so that it comes to lick the frustoconical interior wall of the funnel, the angle at the apex of said funnel (13) having a value that is substantially equal to $2\beta$, the small base of the frustoconical shape of said funnel having a diameter equal to D+2E, the value $\omega$ of the speed in rotation of the supply (15) expressed in revolutions per second, and the value T of the speed in translation of the primary portion (12) expressed in meters per second being associated by the following relationship:

$$\omega = \frac{T}{D\pi[\tan(\frac{\pi}{2} - \beta)]}.$$

2. A method according to claim 1, characterized by the fact that it consists in preparing X supplies (15-1, 15-2, …) each of one fiber, one end of each fiber being connected to the primary portion (12), the X fibers penetrating into the funnel (13) via its large opening (24), and in driving said supplies in rotary movement (R) at the same speed of rotation of value $\omega$ about the axis (100) of the primary portion, while causing said primary portion (12) to move in translation at the speed of value T towards said small opening of the funnel, the number X of said supplies being equal to:

$$X = \pi \frac{D}{E} \sin(\frac{\pi}{2} - \beta).$$

3. A method according to claim 1, characterized by the fact that said movement in translation is selected from one of the following two kinds of movement: continuous translation; stepwise translation.

4. A method according to claim 3, characterized by the fact that stepwise translation is obtained by applying oscillating motion to said funnel (13) along its axis, the small opening (14) presenting a shape that is substantially cylindrical and including biting teeth on the surface of its inside wall.

5. A method according to claim 1 for making a spring wire, the wire comprising "n" layers (C) of fibers (Fb) each having a thickness E and being wound in "n" helices on one another in coaxial manner, respectively in left-handed and in right-handed helices on a cylindrical "primary" portion (12) of diameter equal to D, the tangents to said "n" helices making angles relative to the axis (100) of the primary portion having respective values $\beta_1, \beta_2, \ldots, \beta_n$ progressing from $-\Delta-\gamma$ to $\Delta+\gamma$, said "n" layers (C) also being suitable for being bonded to one another and to the primary portion (12) by a matrix (Rp), the method being characterized by the fact that it consists:

in preparing a funnel (13) of frustoconical shape having an angle at the apex substantially equal to $2(\Delta+\gamma)$, said funnel having a small opening (14) corresponding to the small base of the frustoconical shape of diameter equal to D+2nE;

in preparing "n" supplies (15) of fibers;

in connecting one of the ends (16) of each of the "n" fibers to the primary portion (12), said "n" fibers penetrating into the funnel (13) via its large opening (24) corresponding to the large base of the frustoconical shape; and in driving the "n" supplies (15) in rotary movement (R) and in directions opposite to one another at respective speeds of rotation of values $\omega_1, \omega_2, \ldots, \omega_n$ about the axis (100) of the primary portion (12), said primary portion being moved in translation (17) through the funnel (13) along its axis going from its large opening (24) towards its small opening (14), the values $\omega_1, \omega_2, \ldots, \omega_n$ of the respective speeds of rotation of the "n" supplies (15) being functions of the value T of the speed in translation of the primary portion.

6. A method according to claim 1, characterized by the fact that it further consists in filling said funnel (13) in a liquid matrix (Rp) prior to setting at least one supply (15) in rotation and to setting the primary portion into translation.

7. A method according to claim 5, characterized by the fact that it consists in surrounding said small opening (14) of the funnel (13) with a sleeve (20) having an inlet orifice of substantially the same diameter as said small opening, and an outlet orifice (20) of a shape adapted to the shape of the section desired for the wire.

8. A wire for making a spring, the wire being obtained by the method according to claim 1, said wire being substantially cylindrical in shape (FR) and including at least a first plurality of layers $(C_{x-1}, C_x, \ldots, C_n)$ of wound fibers (Fb), said layers being situated on one another and being impregnated with a matrix (Rp), the wire being characterized by the fact that said first plurality of layers comprises at least two layers $(C_{x-1}, C_x)$ of fibers situated on each other, the fibers of these two layers being wound in opposite directions relative to each other in two helical pitches about a common axis (10), respectively left-handedly and right-handedly, the tangents to these two helices forming angles relative to said axis (10) with respective values $\beta_{x-1}$ and $\beta_x$ that are substantially equal respectively to $\Delta+k\gamma$ and $-\Delta-k\gamma$, where $\gamma$ is a function of the value of the modulus of elasticity for the spring to be obtained and "k" is a factor of having a value lying in the range zero to one, the value $\Delta$ being no greater than substantially 44.6°.

9. A wire according to claim 8 for making a spring suitable for working in compression, the wire being characterized by the fact that said first plurality of layers comprises an even number "n" of layers $C_1, \ldots, C_n$ of fibers (Fb) situated on one another, the layer $C_1$ being the closest to said axis (10), said fibers being wound in helices that are all coaxial about said axis (10), the helices of two consecutive layers $C_1, C_2; \ldots, C_{n-1}, C_n$ being respectively left-handed and right-handed, and the tangents to these helices forming angles relative to said axis having values respectively equal to:

$-\Delta$ and $\Delta$ for the first pair of layers $C_1, C_2$;
$-(\Delta+2\alpha)$ and $+\Delta+2\alpha$ for the second pair of layers $C_3, C_4$;
$-(\Delta+4\alpha)$ and $\Delta+4\alpha$ for the third pair of layers $C_5, C_6$;
and so on up to $-(\Delta+(n-2)\alpha)$ and $\Delta+(n-2)\alpha$ for the $(n/2)^{th}$ pair of layers $C_{n-1}, C_n$;
where $\Delta$ is no greater than substantially 44.6°, and $-\alpha$ is substantially equal to $$\frac{\gamma}{n-2}.$$

10. A wire according to claim 8 for making a spring suitable for working in compression, the wire being characterized in that said first plurality of layers comprises "n" layers $C_1, \ldots, C_n$ of fibers (Fb) situated on one another, the layer $C_1$ being the closest to said axis (10), the fibers being wound in helices that are all coaxial about said axis (10), the helices of two consecutive layers being respectively left-handed and right-handed, and the tangents to the helices forming angles relative to said axis having values respectively equal to:

$-\Delta, +\Delta+\alpha, -(\Delta+2\alpha), \Delta+3\alpha, -(\Delta+4\alpha), \Delta+5\alpha, \ldots,$
$-(\Delta+(n-2)\alpha), \Delta+(n-1)\alpha;$ where $\Delta$ is no greater than substantially 44.6°, and $-\alpha$ is substantially equal to $$\frac{\gamma}{n-1}.$$

11. A wire according to claim 8 for making a spring suitable for working in traction, the wire being characterized by the fact that said first plurality of layers comprises an even number "n" of layers $C_1, \ldots, C_n$ of fibers (Fb) situated on one another, the layer $C_1$ being the closest to said axis (10), said fibers being wound in helices that are all coaxial about said axis (10), the helices of two consecutive layers $C_1, C_2; \ldots, C_{n-1}, C_n$; being respectively left-handed and right-handed, and the tangents to the helices forming angles with said axis having values respectively equal to:

$\Delta$ and $-\Delta$ for the first pair of layers $C_1, C_2$;
$\Delta+2\alpha$ and $-(\Delta+2\alpha)$ for the second pair of layers $C_3, C_4$;
$\Delta+4\alpha$ and $-(\Delta+4\alpha)$ for the third pair of layers $C_5, C_6$;
and so on up to $\Delta+(n-2)\alpha$ and $-(\Delta+(n-2)\alpha)$ for the $(n/2)^{th}$ pair of layers $C_{n-1}, C_n$;
where $\Delta$ is no greater than substantially 44.60°, and $-\alpha$ is substantially equal to $$\frac{\gamma}{n-2}.$$

12. A wire according to claim 8 for making a spring suitable for working in traction, characterized by the fact that said first plurality of layers comprises "n" layers $C_1, \ldots, C_n$ of fibers (Fb) situated on one another, the layer $C_1$ being the closest to said axis (10), the fibers being wound in helices that are all coaxial about said axis (10), the helices of two consecutive layers being respectively left-handed and right-handed, and the tangents to the helices forming angles with said axis having respective values equal to:

$\Delta, -(\Delta 1\alpha), \Delta+2\alpha, -(\Delta+3\alpha), \Delta+4\alpha, -(\Delta+5\alpha), \ldots,$
$\Delta+(n-2)\alpha), -(\Delta+(n-1)\alpha)$ where $\Delta$ is no greater than substantially 44.60°, and $-\alpha$ is substantially equal to $$\frac{\gamma}{n-1}.$$

13. A wire according to claim 8, characterized by the fact that said first plurality of layers is situated at the periphery of the cylinder (FR).

14. A wire according to claim 8, characterized by the fact that it further comprises a central core (Ac).

15. A wire according to claim 14, characterized by the fact that said central core (Ac) is made of a material having a low modulus of elasticity in twisting.

16. A wire according to claim 14, characterized by the fact that said central core (Ac) is made of a material having a low modulus of elasticity in twisting and a second plurality of layers of fibers situated concentrically on one another at the periphery of the central core, the fibers being wound in helices that are coaxial and the tangents to said helices forming angles with the axis (10) of the helices having absolute values that are no greater than substantially 44.6°.

17. A wire according to claim 16, characterized by the fact that in the second plurality of layers of fibers (Fb), the number of left-handed helices is equal to the number of right-handed helices.

18. A wire according to claim 8, characterized by the fact that it further comprises a protective sheath (11) surrounding the outside and in contact with the last layer ($C_n$) of the first plurality of layers of fibers (Fb).

19. A wire according to claim 8, characterized by the fact that said fibers are glass fibers and said matrix (Rp) is a polymerizable resin.

20. A wire according to claim 8, characterized by the fact that the layer situated at the periphery of the cylinder (FR) is thicker than the layer situated inside.

21. A wire according to claim 8, characterized by the fact that the value $\Delta$ for the layer ($C_{x-1}$) of the layer closest to said axis (10) is greater than the value $\Delta$ for the layer ($C_x$) closest to the periphery of the cylinder (FR).

22. A wire according to claim 21, characterized by the fact that it has about ten layers in said plurality ($C_1, \ldots, C_n$), said value $\Delta$ decreasing substantially continuously from substantially 44.6° to 42° on going from the first layer ($C_1$) at the central core to the last layer ($C_n$) at the periphery.

* * * * *